(12) United States Patent  
Cu et al.

(10) Patent No.: US 11,070,529 B2
(45) Date of Patent: Jul. 20, 2021

(54) METHOD FOR WIRELESS FIDELITY CONNECTION AND RELATED PRODUCTS

(71) Applicant: Guangdong Oppo Mobile Telecommunications Corp., Ltd., Guangdong (CN)

(72) Inventors: Botao Cu, Guangdong (CN); Yadong Hu, Guangdong (CN); Yi Yu, Guangdong (CN); Shimin Jiang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/535,872

(22) Filed: Aug. 8, 2019

(65) Prior Publication Data
US 2019/0364427 A1 Nov. 28, 2019

Related U.S. Application Data

(63) Continuation of application No. PCT/CN2017/103186, filed on Sep. 25, 2017.

(30) Foreign Application Priority Data

Feb. 20, 2017 (CN) .......................... 201710091627.6

(51) Int. Cl.
*H04L 29/06* (2006.01)
*H04W 76/10* (2018.01)
*H04W 8/18* (2009.01)
*H04W 12/03* (2021.01)
(Continued)

(52) U.S. Cl.
CPC .......... *H04L 63/0428* (2013.01); *H04L 63/08* (2013.01); *H04W 8/18* (2013.01);
(Continued)

(58) Field of Classification Search
CPC ... H04L 63/0428; H04L 63/08; H04L 63/083; H04L 41/0253; H04L 41/12; H04L 41/14;
(Continued)

(56) References Cited

U.S. PATENT DOCUMENTS 8,695,063 B2 4/2014 Kholaif et al.
2008/0130595 A1* 6/2008 Abdel-Kader ........ H04W 48/16
370/338
(Continued)

FOREIGN PATENT DOCUMENTS

CN 102231887 A 11/2011
CN 103458409 A 12/2013
(Continued)

OTHER PUBLICATIONS

Extended European search report issued in corresponding European application No. 17897160.2 dated Dec. 19, 2019.
(Continued)

*Primary Examiner* — Abiy Getachew

(57) ABSTRACT

A method for Wi-Fi connection and related products are provided. The method includes the following. A first password input in response to user operation is obtained, where the first password is used for connecting to a target AP. In response to an unsuccessful verification of the first password, according to property information of the target AP, N target Wi-Fi connection records corresponding to the target AP are obtained from historical Wi-Fi connection data, where the historical Wi-Fi connection data contains M Wi-Fi connection records, M is a positive integer, and N is a positive integer smaller than or equal to M. Connect to the target AP according to the N target Wi-Fi connection records.

18 Claims, 5 Drawing Sheets

(51) Int. Cl.
*H04W 12/069* (2021.01)
*H04W 84/12* (2009.01)

(52) U.S. Cl.
CPC ......... *H04W 12/03* (2021.01); *H04W 12/069* (2021.01); *H04W 76/10* (2018.02); *H04W 84/12* (2013.01)

(58) Field of Classification Search
CPC ..... H04L 41/147; H04L 41/22; H04L 43/045; H04L 43/0876; H04L 43/0882; H04L 43/0888; H04L 43/0894; H04W 12/0609; H04W 76/10; H04W 12/001; H04W 8/18; H04W 84/12; H04W 48/16; H04W 12/06; H04W 48/08; H04W 64/003; H04W 72/1247; H04W 76/18; H04W 24/02; H04W 48/20; H04W 88/18; H04W 8/005; H04B 17/26
See application file for complete search history.

(56) References Cited

U.S. PATENT DOCUMENTS

| | | | |
|---|---|---|---|
| 2014/0143629 A1* | 5/2014 | Hassan | H04W 24/04 714/758 |
| 2014/0362841 A1* | 12/2014 | Shibata | H04W 48/18 370/338 |
| 2016/0105846 A1 | 4/2016 | Anderson et al. | |
| 2017/0288868 A1* | 10/2017 | Song | H04N 5/2257 |

FOREIGN PATENT DOCUMENTS

| | | |
|---|---|---|
| CN | 104735670 A | 6/2015 |
| CN | 105657781 A | 6/2016 |
| CN | 105682015 A | 6/2016 |
| WO | 2008061347 A1 | 5/2008 |
| WO | 2014042464 A2 | 3/2014 |
| WO | 2014154101 A1 | 10/2014 |

OTHER PUBLICATIONS

International search report issued in corresponding international application No. PCT/CN2017/103186 dated Nov. 30, 2017.

First Examination Report issued in corresponding IN application No. 201917032644 dated Nov. 24, 2020.

* cited by examiner

METHOD FOR WIRELESS FIDELITY CONNECTION AND RELATED PRODUCTS

CROSS-REFERENCE TO RELATED APPLICATION(S)

This application is a continuation of International Application No. PCT/CN2017/103186, filed on Sep. 25, 2017, which claims priority to Chinese Patent Application No. 201710091627.6, filed on Feb. 20, 2017, both of which are incorporated herein by reference in their entireties.

TECHNICAL FIELD

The present disclosure relates to the technical field of communications, and particularly to a method for wireless fidelity (Wi-Fi®) connection and related products.

BACKGROUND

With rapid development of information technologies, terminals such as mobile phones and tablet computers become increasingly popular. User requirements on the terminals also become increasingly high. There is not only a need for a relatively high processing speed, but also an increasing dependence on Wi-Fi. With popularization of the terminals and Wi-Fi, it is frequent to connect the terminals to a Wi-Fi network.

Generally, only when a service set identifier (SSID), an encryption scheme, and a password are all matched, the terminals can be normally connected to an access point (AP).

SUMMARY

Implementations of the present disclosure provide a method for Wi-Fi connection and related products.

According to a first aspect of the present disclosure, a method for Wi-Fi connection is provided. The method includes the following. An input password used for connecting a terminal to a target AP is obtained. In response to an unsuccessful verification of the input password, according to property information of the target AP, N target Wi-Fi connection records corresponding to the target AP are obtained from historical Wi-Fi connection data, where the historical Wi-Fi connection data contains M Wi-Fi connection records, M is a positive integer, and N is a positive integer smaller than or equal to M. The terminal is connected to the target AP according to the N target Wi-Fi connection records.

According to a second aspect of the present disclosure, a terminal is provided. The terminal includes at least one processor, and a computer readable memory, coupled to the at least one processor and storing at least one computer executable instruction therein, which when executed by the at least one processor, causes the at least one processor to carry out the following actions. An input password used for connecting the terminal to a target AP is obtained. In response to an unsuccessful verification of the input password, according to property information of the target AP, N target Wi-Fi connection records corresponding to the target AP are obtained from historical Wi-Fi connection data, where the historical Wi-Fi connection data contains M Wi-Fi connection records, M is a positive integer, and N is a positive integer smaller than or equal to M. The terminal is connected to the target AP according to the N target Wi-Fi connection records.

According to a third aspect of the present disclosure, a terminal is provided. The terminal includes at least one processor, and a computer readable memory, coupled to the at least one processor and storing at least one computer executable instruction therein, which when executed by the at least one processor, causes the at least one processor to carry out the following actions. In response to an unsuccessful connection to an AP according to an input password, at least one password is determined from historical Wi-Fi connection data pre-stored in the terminal, where the at least one password was previously used for connecting the terminal to the AP. The terminal is connected to the AP according to the at least one password.

BRIEF DESCRIPTION OF THE DRAWINGS

To describe technical solutions in implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
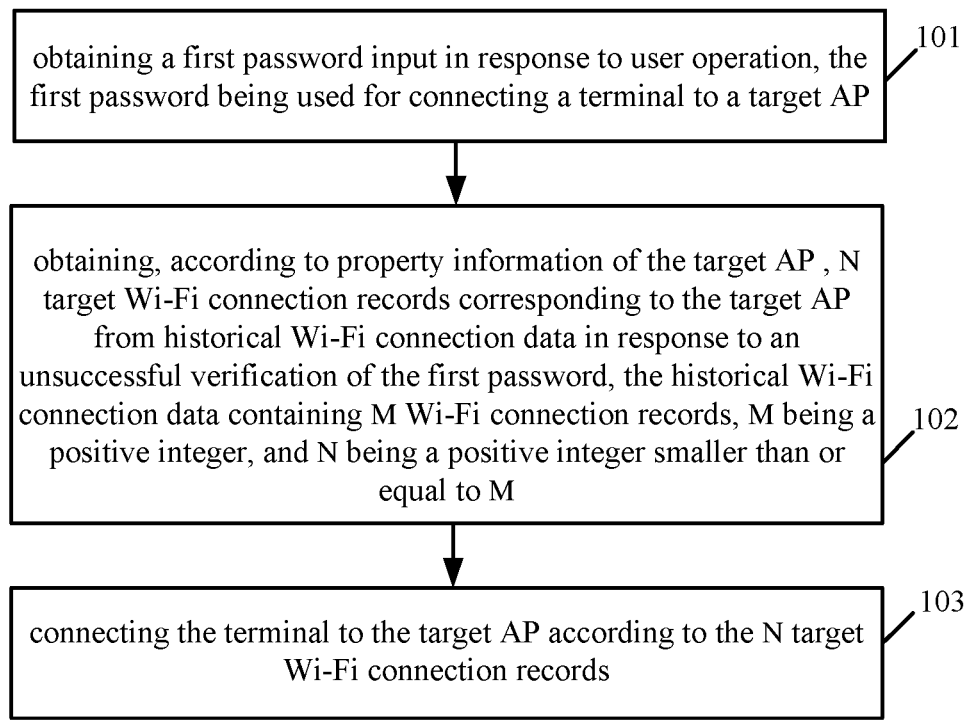
FIG. 1 is a flow chart illustrating a method for Wi-Fi connection according to a first implementation of the present disclosure.

In related arts, it may take some time for a user to know a password of an AP when going to a place. However, due to some error operations or that a terminal only records a limited number of APs, some AP records may be cleared during usage. Therefore, a password needs to be input once again to be connected the terminal to an AP previously connected. If several error passwords are input, an efficiency of Wi-Fi connection is accordingly reduced. Therefore, implementations of the present disclosure provide a method for Wi-Fi connection and related products, so as to improve the efficiency of Wi-Fi connection.

Technical solutions of the present disclosure will be further described below through implementations with reference to the accompanying drawings. Apparently, the described implementations are merely some of rather than all implementations of the present disclosure. All other implementations obtained by those of ordinary skill in the art based on the implementations of the present disclosure without creative efforts shall fall within the protection scope of the present disclosure.

The terms "first", "second", "third", "fourth", and the like used in the specification, the claims, and the accompany drawings of the present disclosure are used to distinguish different objects rather than describe a particular order. Further, the terms "include", "comprise", and "have" as well as variations thereof are intended to cover non-exclusive inclusion. For example, a process, method, system, product, or apparatus including a series of steps or units is not limited to the listed steps or units; on the contrary, it can optionally include other steps or units that are not listed; alternatively, other steps or units inherent to the process, method, product, or device can be included either.

"Implementation" mentioned in the disclosure means that specific characteristics, structures, or properties described in connection with an implementation may be included in at least one implementation of the disclosure. This word appears at each position in the specification does not refer to the same implementation as well as an independent or alternate implementation mutually exclusive to other implementations. It may be explicitly and implicitly understood by those skilled in the art that the implementations described in the disclosure may be combined with the other implementations.

A terminal described in the implementations of the present disclosure may include a smart phone (such as an Android® phone, an iOS® phone, and a Windows® phone), a tablet computer, a palmtop computer, a notebook computer, a mobile Internet device (MID), wearable equipment, or the like, which are not exhausted but only listed as examples. The terminal includes, but is not limited to, the listed terminals.

Historical Wi-Fi connection data in the implementations of the present disclosure may contain multiple Wi-Fi connection records. Each Wi-Fi connection record may contain an AP previously connected (a terminal was previously connected to the AP), i.e., each Wi-Fi connection record contains property information of an AP, where the property information may include at least one of an SSID, a basic service set identifier (BSSID), an encryption scheme, a password, and so on. Certainly, each time the terminal is connected to an AP, a Wi-Fi connection record can be generated to record an SSID, a BSSID, an encryption scheme, and a password of the AP.

According to a first aspect of the present disclosure, a method for Wi-Fi connection is provided. The method includes the following. An input password used for connecting a terminal to a target AP is obtained. In response to an unsuccessful verification of the input password, according to property information of the target AP, N target Wi-Fi connection records corresponding to the target AP are obtained from historical Wi-Fi connection data, where the historical Wi-Fi connection data contains M Wi-Fi connection records, M is a positive integer, and N is a positive integer smaller than or equal to M. The terminal is connected to the target AP according to the N target Wi-Fi connection records.

In at least one implementation, according to the property information of the target AP, the N target Wi-Fi connection records corresponding to the target AP are obtained from the historical Wi-Fi connection data as follows. An SSID and an encryption scheme of the target AP are obtained. According to the SSID and the encryption scheme of the target AP, the N target Wi-Fi connection records are determined from the historical Wi-Fi connection data.

In at least one alternative implementation, according to the property information of the target AP, the N target Wi-Fi connection records corresponding to the target AP are obtained from the historical Wi-Fi connection data as follows. A BSSID of the target AP is obtained. The N target Wi-Fi connection records are determined from the historical Wi-Fi connection data, where each of the N target Wi-Fi connection records contains the BSSID.

In at least one alternative implementation, according to the property information of the target AP, the N target Wi-Fi connection records corresponding to the target AP are obtained from the historical Wi-Fi connection data as follows. An encryption scheme of the target AP is obtained. According to the encryption scheme of the target AP, the N target Wi-Fi connection records are determined from the historical Wi-Fi connection data.

In at least one alternative implementation, according to the property information of the target AP, the N target Wi-Fi connection records corresponding to the target AP are obtained from the historical Wi-Fi connection data as follows. An SSID of the target AP is obtained. According to the SSID of the target AP, the N target Wi-Fi connection records are determined from the historical Wi-Fi connection data.

In at least one implementation, the terminal is connected to the target AP according to the N target Wi-Fi connection records as follows. The N target Wi-Fi connection records are saved to a predetermined list. From the predetermined list, K passwords corresponding to the N target Wi-Fi connection records are obtained, where K is an integer smaller than or equal to N. The terminal is connected to the target AP according to the K passwords.

In at least one implementation, the terminal is connected to the target AP according to the K passwords as follows. An occurrence frequency of each of the K passwords in the predetermined list to obtain K frequencies is determined. A priority sequence of the K passwords is determined according to the K frequencies. According to the priority sequence, a password is selected from the K passwords. The terminal is connected to the target AP according to the password selected, an SSID and an encryption scheme of the target AP.

In at least one implementation, the method further includes the following. A ratio of the number of occurrence times of each of the K passwords in the predetermined list to N is determined as the occurrence frequency of each of the K passwords in the predetermined list.

In at least one implementation, the input password includes at least one of a character string, fingerprint information, voice information, and iris information.

According to a second aspect of the present disclosure, a terminal is provided. The terminal includes at least one processor, and a computer readable memory, coupled to the at least one processor and storing at least one computer executable instruction therein, which when executed by the at least one processor, causes the at least one processor to carry out the following actions. An input password used for connecting the terminal to a target AP is obtained. In response to an unsuccessful verification of the input password, according to property information of the target AP, N target Wi-Fi connection records corresponding to the target AP are obtained from historical Wi-Fi connection data, where the historical Wi-Fi connection data contains M Wi-Fi connection records, M is a positive integer, and N is a positive integer smaller than or equal to M. The terminal is connected to the target AP according to the N target Wi-Fi connection records.

According to a third aspect of the present disclosure, a terminal is provided. The terminal includes at least one processor, and a computer readable memory, coupled to the at least one processor and storing at least one computer executable instruction therein, which when executed by the at least one processor, causes the at least one processor to carry out the following actions. In response to an unsuccessful connection to an AP according to an input password, at least one password is determined from historical Wi-Fi connection data pre-stored in the terminal, where the at least one password was previously used for connecting the terminal to the AP. The terminal is connected to the AP according to the at least one password.

Referring to FIG. 1, FIG. 1 is a flow chart illustrating a method for Wi-Fi connection according to a first implementation of the present disclosure. The method for Wi-Fi connection illustrated in the implementation includes the following.

At block 101, a first password input in response to user operation is obtained, where the first password is used for connecting a terminal to a target AP.

The first password may be at least one of a character string, fingerprint information, voice information, iris information, and so on. The terminal can display a Wi-Fi list on a display screen of the terminal. The Wi-Fi list may contain information of multiple APs. The target AP can be selected. The first password of the target AP can be input in response to user operation.

At block 102, in response to an unsuccessful verification of the first password, N target Wi-Fi connection records corresponding to the target AP are obtained from historical Wi-Fi connection data according to the property information of the target AP, where the historical Wi-Fi connection data contains M Wi-Fi connection records, M is a positive integer, and N is a positive integer smaller than or equal to M.

The terminal can verify the first password. In response to a successful verification of the first password, the terminal can be connected to the target AP. In response to the unsuccessful verification of the first password, according to the property information of the target AP, the N target Wi-Fi connection records corresponding to the target AP can be obtained from the historical Wi-Fi connection data.

In an implementation, at block 102, according to the property information of the target AP, the N target Wi-Fi connection records corresponding to the target AP can be obtained from the historical Wi-Fi connection data as follows.

An SSID of the target AP is obtained. According to the SSID of the target AP, the N target Wi-Fi connection records are determined from the historical Wi-Fi connection data.

According to an SSID of the target AP, the N target Wi-Fi connection records corresponding to the target AP can be determined from the historical Wi-Fi connection data.

In an implementation, at block 102, according to the property information of the target AP, the N target Wi-Fi connection records corresponding to the target AP can be obtained from the historical Wi-Fi connection data as follows.

An encryption scheme of the target AP is obtained. According to the encryption scheme of the target AP, the N target Wi-Fi connection records are determined from the historical Wi-Fi connection data.

According to the encryption scheme of the target AP, the N target Wi-Fi connection records corresponding to the target AP can be determined from the historical Wi-Fi connection data.

In an implementation, at block 102, according to the property information of the target AP, the N target Wi-Fi connection records corresponding to the target AP can be obtained from the historical Wi-Fi connection data as follows.

21) The SSID and the encryption scheme of the target AP are obtained.

22) According to the SSID and the encryption scheme of the target AP, the N target Wi-Fi connection records are determined from the historical Wi-Fi connection data.

According to the SSID and the encryption scheme of the target AP, the N target Wi-Fi connection records corresponding to the target AP can be determined from the historical Wi-Fi connection data. Each AP has a corresponding SSID and encryption scheme. Therefore, according to the SSID and the encryption scheme of the target AP, the N target Wi-Fi connection records corresponding to the target AP can be determined from the historical Wi-Fi connection data.

In an implementation, at block 102, according to the property information of the target AP, the N target Wi-Fi connection records corresponding to the target AP can be obtained from the historical Wi-Fi connection data as follows.

23) A BSSID of the target AP is obtained.

24) According to the BSSID of the target AP, the N target Wi-Fi connection records are determined from the historical Wi-Fi connection data, where each of the N target Wi-Fi connection contains the BSSID.

The BSSID of the target AP can be obtained. From the historical Wi-Fi connection data, Wi-Fi connection records each containing the BSSID can be found. For example, the N Wi-Fi connection records can be obtained. Since a BSSID of an AP is generally fixed, the AP can be identified by the BSSID. Accordingly, Wi-Fi connection records of the AP corresponding to the BSSID can be accurately obtained from the historical Wi-Fi connection data.

At block 103, the terminal is connected to the target AP according to the N target Wi-Fi connection records.

The N target Wi-Fi connection records contain N passwords, and thus the terminal can be connected to the target AP according to the N passwords. If the password of the target AP is one of the N passwords, the terminal can be connected to the target AP after N attempts.

In an implementation, at block 103, according to the N target Wi-Fi connection records, the terminal is connected to the target AP as follows.

31) The N target Wi-Fi connection records are saved to a predetermined list.

32) From the predetermined list, K passwords corresponding to the N target Wi-Fi connection records are obtained, where K is an integer smaller than or equal to N.

33) The terminal is connected to the target AP according to the K passwords.

The terminal can save the N target Wi-Fi connection records to the predetermined list. The predetermined list can be set by the user, for example, items in the predetermined list can be set by the user. The predetermined list may contain multiple records, where each record contains an SSID, a BSSID, an encryption scheme, and a password. As illustrated in table 1, an example of the predetermined list is illustrated. Certainly, the predetermined list can be displayed on a display screen of the terminal. Passwords can be extracted from the predetermined list. Since among the N target Wi-Fi connection records, two or more Wi-Fi connection records may have the same password, the K passwords can be obtained, where K is an integer smaller than or equal to N. The terminal then attempts to be connected to the target AP according to the K passwords. For example, if K is 3, and the three passwords are abcded, 112239, and xxx123, respectively, abcded can be first used as a password for connecting to the target AP. If it fails, 112239 can be used as a password for connecting to the target AP. If it fails, xxx123 can then be used as a password for connecting to the target AP.

TABLE 1

| AP | SSID | BSSID | Encryption scheme | Password |
|----|------|-------|-------------------|----------|
| 1 | Cathay | A1 | WPA_PSK | 888888 |
| 2 | 118 | B1 | WPA_PSK | Admini |
| 3 | China-net | C1 | WPA_PSK | 1 + 1 = 2 |

In the implementation of the present disclosure, the method may be applied to an application scenario illustrated as follows. For example, an SSID, an encryption scheme, and a password are input in response to user operation to add a hidden AP. Whether saved AP configuration contains an SSID and an encryption respectively the same as the input SSID and the input encryption scheme can be detected. If the SSID and the encryption of one AP are the same as the input SSID and the input encryption scheme, respectively, before overriding the configuration of the AP, a password of the AP is backed up. If an error password is input for connection, a prompt of error password is output. If an error password is input, the configuration of the AP to be added is modified, and the password of the AP is changed to the backup password. In this case, it can be ensured that the terminal can also be connected to the recorded AP, avoiding the problem of error password. For example, the saved configuration of one AP is the following: an SSID is TEST, an encryption scheme is WAP_PSK, and a password is 12345678; the configuration of the hidden AP to be added is the following: an SSID is TEST, an encryption scheme is WAP_PSK, and a password is 00000000. During adding the AP, the password of the TEST is changed to 00000000, which results in that the terminal cannot be normally connected to the recorded AP. By means of the implementation of the present disclosure, if adding the hidden AP fails, one AP having the same SSID and encryption scheme as the AP to be connected to at current time can be found from the historical Wi-Fi connection data, and the password is recovered to 12345678, and thus the terminal can be normally connected to the recorded AP.

For another example, each time the terminal is connected to an AP, an SSID, an encryption scheme, and a password of the AP can be recorded to form a Wi-Fi connection record corresponding to the AP, and the Wi-Fi connection record is saved to a file. The file may be similar to a file recording AP information in the related art. However, the file just records property information of all APs previously connected. If an input password for connecting to an AP is error, after Wi-Fi scan, a Wi-Fi list can be obtained, and thus the terminal can easily obtain an SSID and an encryption scheme of the AP to which the terminal needs to be connected at current time. From the historical Wi-Fi connection data, one or more APs having the same SSID and AP as the AP to which the terminal needs to be connected at current time are found, and one or more matched Wi-Fi connection records are saved to the predetermined list. If the predetermined list L just contains one Wi-Fi connection record, the password of the matched AP is used for connection. If the predetermined list contains multiple Wi-Fi connection records, the passwords of the APs are traversed for connection. Thus, a probability of connecting to an AP is improved.

For yet another example, after Wi-Fi scan, a Wi-Fi list can be obtained. According to information of APs currently scanned, it is easy to obtain a BSSID of an AP to which the terminal is to be connected at current time, and then the historical Wi-Fi connection data is searched to find whether there are one or more APs each having the BSSID as an MAC address. If one or more APs are found, the one or more APs are recorded in the predetermined list. If the predetermined list just contains one AP, the password of the matched AP is used for connection. If the predetermined list contains multiple APs, the passwords of the APs are traversed for connection (In principle a MAC address of a device is unique, excluding change in response to user operation). Thus, a probability of connecting to an AP is improved.

For yet another example, the target AP may be an AP previously connected by the terminal. Initially, a password of the AP is A, and then the password of the AP is changed to B from A. Generally, after the password is changed to A from B, the terminal still performs Wi-Fi connection by using B, and thus the terminal cannot be connected to the target AP. By means of the implementation of the present disclosure, after an unsuccessful verification of the password, the password previously used for connecting to the target AP can be found from the historical Wi-Fi connection data, and thus the terminal can be connected to the target AP. Certainly, if the terminal was connected to the target AP, the terminal can attempt to be connected to the target AP by using the password previously used for connecting to the target AP.

It can be seen that, by means of the implementation of the present disclosure, the first password input in response to user operation is obtained, where the first password is used for connecting to the target AP. In response to the unsuccessful verification of the first password, according to the property information of the target AP, the N target Wi-Fi connection records corresponding to the target APs are obtained from the historical Wi-Fi connection data, where the historical Wi-Fi connection data contains M Wi-Fi connection records, M is a positive integer, and N is a positive integer smaller than or equal to M. The terminal is connected to the target AP according to the N target Wi-Fi connection records. In this case, the terminal can be connected to the target AP by using the password in the historical Wi-Fi connection data and corresponding to the target AP. Thus, an efficiency of Wi-Fi connection is improved.

Figure 2:
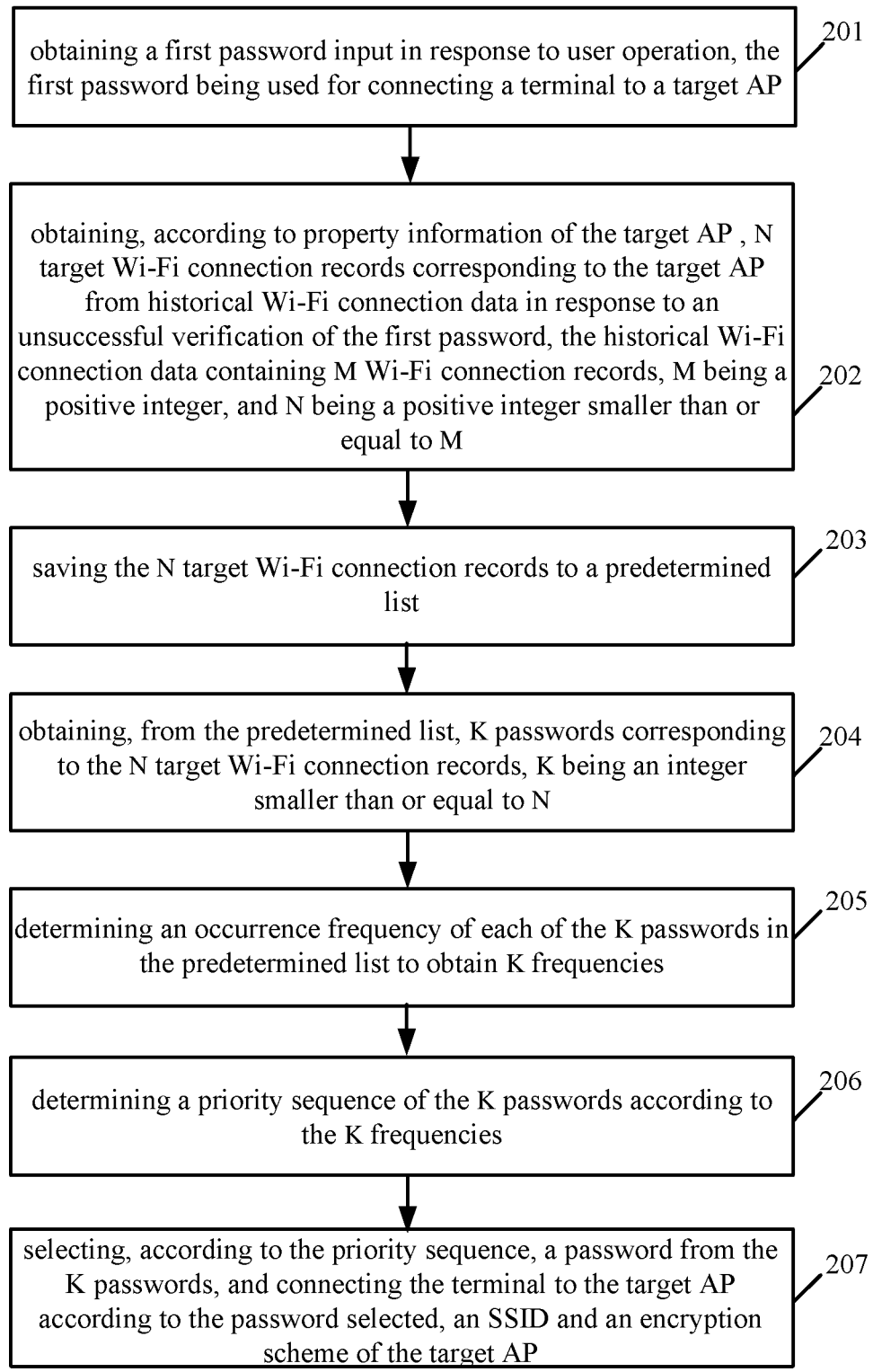
FIG. 2 is a flow chart illustrating a method for Wi-Fi connection according to a second implementation of the present disclosure.

In consistence with the above, referring to FIG. 2, FIG. 2 is a flow chart illustrating a method for Wi-Fi connection according to a second implementation of the present disclosure. The method for Wi-Fi connection illustrated in the implementation includes the following.

At block 201, a first password input in response to user operation is obtained, where the first password is used for connecting a terminal to a target AP.

At block 202, in response to an unsuccessful verification of the first password, according to property information of the target AP, N target Wi-Fi connection records corresponding to the target AP are obtained from the historical Wi-Fi connection data, where the historical Wi-Fi connection data contains M Wi-Fi connection records, M is a positive integer, and N is a positive integer smaller than or equal to M.

At block 203, the N target Wi-Fi connection records are saved to a predetermined list.

At block 204, K passwords corresponding to the N target Wi-Fi connection records are obtained from the predetermined list, where K is an integer smaller than or equal to N.

The terminal can save the N target Wi-Fi connection records to the predetermined list. The predetermined list can be set by the user, for example, items in the predetermined list can be set by the user. Certainly, the predetermined list can be displayed on a display screen of the terminal. Passwords can be extracted from the predetermined list. Since among the N target Wi-Fi connection records, two or more Wi-Fi connection records may have the same password, the K passwords can be obtained, where K is an integer smaller than or equal to N. The terminal is then connected to the target AP according to the K passwords. For example, if K is 3, and the three passwords are abcded, 112239, and xxx123, respectively, abcded can be first used as a password for connecting to the target AP. If it fails, 112239 can be used as a password for connecting to the target AP. If it fails, xxx123 can then be used as a password for connecting to the target AP.

At block 205, an occurrence frequency of each of the K passwords in the predetermined list can be determined to obtain K frequencies.

The N target Wi-Fi historical records at most contain N different passwords. However, generally, places where the user stays are centralized, and thus at the same place, the terminal may be connected to the same AP, and the same password may be used. Thus, the N target Wi-Fi connection records may contain K different passwords, and the number of occurrence times of each of the K passwords in the N target Wi-Fi connection records are different. A ratio of the number of occurrence times of each of the K passwords in the predetermined list to N can be determined as the occurrence frequency of each of the K passwords in the predetermined list. Thus, the frequency of each of the K passwords can be determined.

In an implementation, at block 205, the occurrence frequency of each of the K passwords in the predetermined list can be determined as follows. A ratio of the number of occurrence times of each of the K passwords to N is determined as the occurrence frequency of each of the K passwords. For example, if the number of occurrence times of the password i is a, the occurrence frequency of the password i is a/N.

At block 206, a priority sequence of the K passwords are determined according to the K frequencies.

In the implementation of the present disclosure, a principle for determining the priority sequence is the following. The higher the frequency, the higher the priority, or the lower the frequency, the higher the priority.

At block 207, according to the priority sequence, a password is selected from the K passwords, and the terminal is connected to the target AP according to the password selected, the SSID, and the encryption scheme of the target AP.

After the priority sequence is determined, the password can be selected from the K passwords according to the priority sequence. For example, if there are three passwords, A, B, and C, and the corresponding frequencies are al, bl, and cl, respectively, where cl is higher than al, and al is higher than bl. If the principle for determining the priority sequence is that the higher the frequency, the higher the priority, the password C can be first selected, and then the terminal attempts to be connected to the target AP according to the password C, the SSID and the encryption scheme of the target AP. If it fails, the password A can be selected, and then the terminal attempts to be connected to the target AP according to the password A, the SSID and the encryption scheme of the target AP, and so on.

It can be seen that, by means of the implementation of the present disclosure, the first password input in response to user operation is obtained, where the first password is used for connecting to the target AP. In response to the unsuccessful verification of the first password, according to the property information of the target AP, the N target Wi-Fi connection records corresponding to the target APs are obtained from the historical Wi-Fi connection data, where the historical Wi-Fi connection data contains the M Wi-Fi connection records, M is a positive integer, and N is a positive integer smaller than or equal to M. The N target Wi-Fi connection records are saved to the predetermined list. K passwords corresponding to the N target Wi-Fi connection records are obtained from the predetermined list, where K is an integer smaller than or equal to N. The occurrence frequency of each of the K passwords in the predetermined list are determined to obtain K frequencies. The priority sequence of the K passwords are determined according to the K frequencies. According to the priority sequence, one password is selected from the K passwords, and the terminal is connected to the target AP according to the SSID and the encryption scheme of the target AP. Thus, the terminal can be connected to the target AP by using the password in the historical Wi-Fi connection data and corresponding to the target AP, thereby improving an efficiency of Wi-Fi connection.

In consistence with the above, an apparatus for implementing the above method for Wi-Fi connection is provided, as described in detail below.

Figure 3:
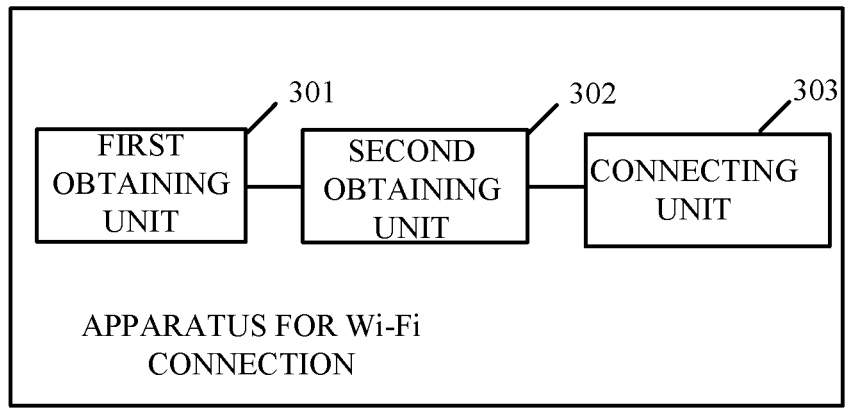
FIG. 3 is a block diagram illustrating an apparatus for Wi-Fi connection according to an implementation of the present disclosure.

Referring to FIG. 3, FIG. 3 is a block diagram illustrating the apparatus for Wi-Fi connection according to an implementation of the present disclosure. The apparatus for Wi-Fi connection illustrated in the implementation includes a first obtaining unit 301, a second obtaining unit 302, and a connecting unit 303.

The first obtaining unit 301 is configured to obtain a first password input in response to user operation, where the first password is used for connecting a terminal to a target AP.

The second obtaining unit 302 is configured to obtain, according to property information of the target AP, N target Wi-Fi connection records corresponding to the target AP from historical Wi-Fi connection data in response to an unsuccessful verification of the first password, where the historical Wi-Fi connection data contains M Wi-Fi connection records, M is a positive integer, and N is a positive integer smaller than or equal to M The connecting unit 303 is configured to connect the terminal to the target AP according to the N target Wi-Fi connection records.

Figure 4:
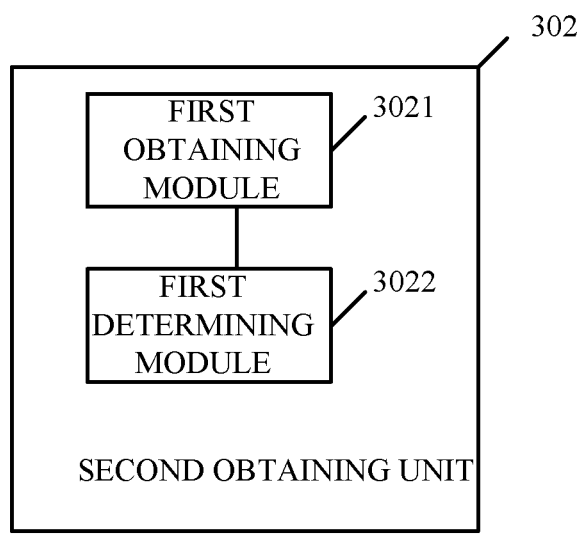
FIG. 4 is a block diagram illustrating a second obtaining unit of the apparatus for Wi-Fi connection illustrated in FIG. 3 according to an implementation of the present disclosure.

In an implementation, FIG. 4 illustrates a detailed structure of the second obtaining unit 302 of the apparatus for Wi-Fi connection illustrated in FIG. 3. As illustrated in FIG. 4, the second obtaining unit 302 may include a first obtaining module 3021 and a first determining module 3022.

The first obtaining module 3021 is configured to obtain an SSID and an encryption scheme of the target AP.

The first determining module 3022 is configured to determine, according to the SSID and the encryption scheme of the target AP, the N target Wi-Fi connection records from the historical Wi-Fi connection data.

Figure 5:
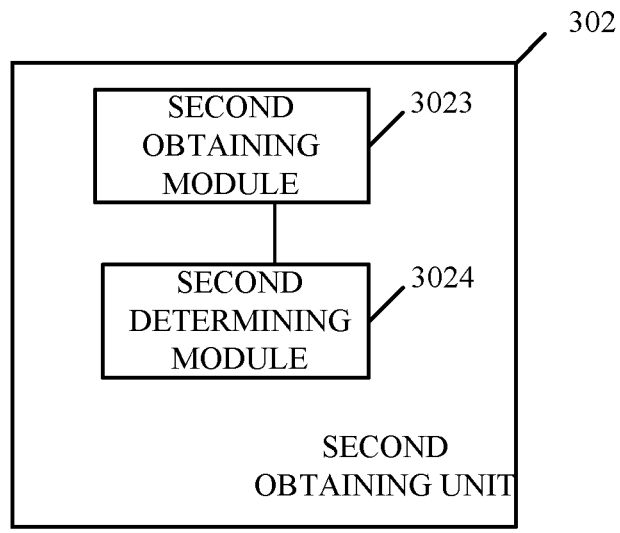
FIG. 5 is another block diagram illustrating the second obtaining unit of the apparatus for Wi-Fi connection illustrated in FIG. 3 according to an implementation of the present disclosure.

In an implementation, FIG. 5 illustrates another detailed structure of the second obtaining unit of the apparatus for Wi-Fi connection illustrated in FIG. 3. As illustrated in FIG. 5, the second obtaining unit 302 may include a second obtaining module 3023 and a second determining module.

The second obtaining module 3023 is configured to obtain a BSSID of the target AP.

The second determining module 3024 is configured to determine the N target Wi-Fi connection records from the historical Wi-Fi connection data, where each of the N target Wi-Fi connection records contains the BSSID.

In an implementation, the second obtaining unit 302 is configured to obtain an encryption scheme of the target AP, and determine, according to the encryption scheme of the target AP, the N target Wi-Fi connection records from the historical Wi-Fi connection data.

In an implementation, the second obtaining unit 302 is configured to obtain an SSID of the target AP, and determine, according to the SSID of the target AP, the N target Wi-Fi connection records from the historical Wi-Fi connection data.

Figure 6:
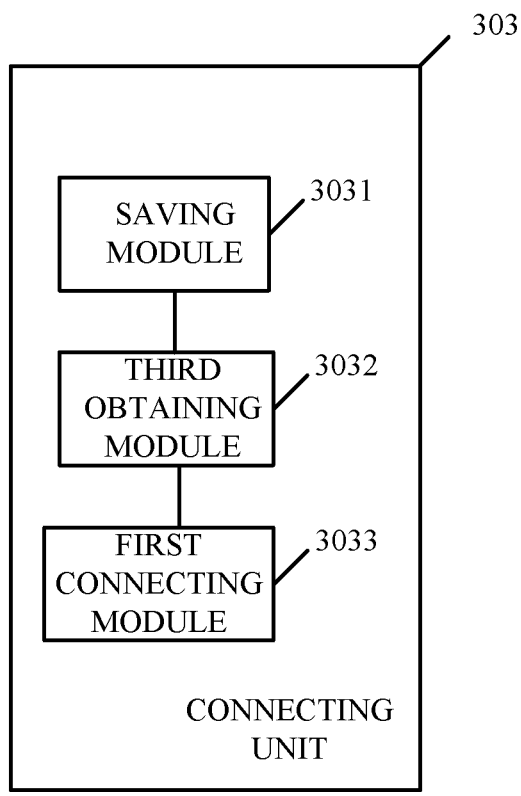
FIG. 6 is a block diagram illustrating a connecting unit of the apparatus for Wi-Fi connection illustrated in FIG. 3 according to an implementation of the present disclosure.

In an implementation, FIG. 6 illustrates a detailed structure of the connecting unit of the apparatus for Wi-Fi connection as illustrated in FIG. 3. As illustrated in FIG. 6, the connecting unit 303 may include a saving module 3031, a third obtaining module 3032, and a first connecting module 3033.

The saving module 3031 is configured to save the N target Wi-Fi connection records to a predetermined list.

The third obtaining module 3032 is configured to obtain, from the predetermined list, K passwords corresponding to the N target Wi-Fi connection records, where K is an integer smaller than or equal to N.

The first connecting module 3033 is configured to connect the terminal to the target AP according to the K passwords.

Figure 7:
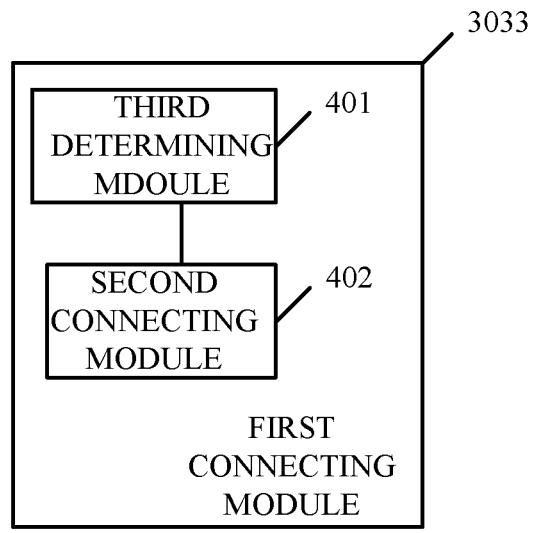
FIG. 7 is a block diagram illustrating a first connecting module of the connecting unit illustrated in FIG. 6 according to an implementation of the present disclosure.

Furthermore, in an implementation, FIG. 7 illustrates a detailed structure of the first connecting module 3033 of the connecting unit 303 as illustrated in FIG. 6. As illustrated in FIG. 7, the first connecting module 3033 may include a third determining module 401 and a second connecting module 402.

The third determining module 401 is configured to determine an occurrence frequency of each of the K passwords in the predetermined list to obtain K frequencies, and determine a priority sequence of the K passwords according to the K frequencies.

The second connecting module 402 is configured to select a password from the K passwords according to the priority sequence, and connect the terminal to the target AP according to the password selected, an SSID and an encryption scheme of the target AP.

In an implementation, the third determining module 401 configured to determine the occurrence frequency of each of the K passwords in the predetermined list is configured to determine a ratio of the number of occurrence times of each of the K passwords to N as the occurrence frequency of each of the K passwords.

In an implementation, the first password may be at least one of the following: a character string, fingerprint information, voice information, and iris information.

It can be seen that, by means of the implementation of the present disclosure, the first password input in response to user operation is obtained, where the first password is used for connecting to the target AP. In response to the unsuccessful verification of the first password, according to the property information of the target AP, the N target Wi-Fi connection records corresponding to the target APs are obtained from the historical Wi-Fi connection data, where the historical Wi-Fi connection data contains M Wi-Fi connection records, M is a positive integer, and N is a positive integer smaller than or equal to M. The terminal is connected to the target AP according to the N target Wi-Fi connection records. In this case, the terminal can be connected to the target AP by using the password in the historical Wi-Fi connection data and corresponding to the target AP. Thus, an efficiency of Wi-Fi connection is improved.

It is to be noted that, the apparatus for Wi-Fi connection described in the apparatus implementation of the disclosure is presented in the form of functional units. The term "unit" used herein should be understood as the broadest meaning as possible, and an object for implementing functions defined by each "unit" may be, for example, an application specific integrated circuit (ASIC), a single circuit, a processor (shared, dedicated, or chipset) and a memory for executing one or more software or firmware programs, a combinational logic circuit, and/or other suitable components that can achieve the above described functions.

Figure 8:
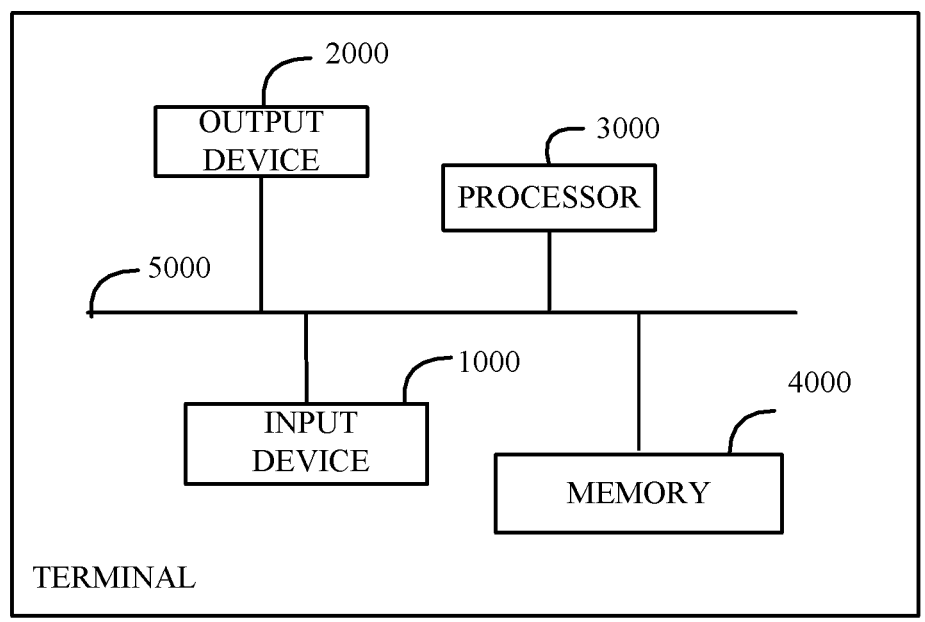
FIG. 8 is a block diagram illustrating a terminal according to an implementation of the present disclosure.

For example, the first obtaining unit 301 configured to obtain the first password input in response to user operation and used for connecting to the target AP may be implemented by a terminal illustrated in FIG. 8. A processor 3000 may obtain the first password input in response to user operation and used for connecting to the target AP by invoking executable program codes stored in a memory 4000.

In consistence with the above, referring to FIG. 8, FIG. 4 is a block diagram illustrating the terminal according to an implementation of the present disclosure. The terminal described in the implementation includes at least one input device 1000, at least one output device 2000, at least one processor 3000 such as a central processing unit (CPU), and a memory 4000. The input device 1000, the output device 2000, the processor 3000, and the memory 4000 are coupled with each other through a bus 5000.

The input device 1000 may be a touch screen, a physical key, or a mouse.

The output device 2000 may be a display screen.

The memory 4000 may be a random access memory (RAM), and may be a non-volatile memory, such as a disk storage. The memory 4000 is configured to store a set of program codes, and the input device 1000, the output device 2000, and the processor 3000 are configured to invoke the program codes stored in the memory 4000 to perform the following.

The processor 3000 is configured to obtain a first password input in response to user operation and used for connecting the terminal to a target AP, and obtain, according to property information of the target AP, N target Wi-Fi connection records corresponding to the target AP from historical Wi-Fi connection data in response to an unsuccessful verification of the first password, where the historical Wi-Fi connection data contains M Wi-Fi connection records, M is a positive integer, and N is a positive integer smaller than or equal to M. The processor 3000 is further configured to connect the terminal to the target AP according to the N target Wi-Fi connection records.

In an implementation, the processor 3000 configured to obtain, according to the property information of the target AP, the N target Wi-Fi connection records corresponding to the target AP from the historical Wi-Fi connection data is configured to obtain an SSID and an encryption scheme of the target AP, and determine, according to the SSID and the encryption scheme of the target AP, the N target Wi-Fi connection records from the historical Wi-Fi connection data.

In an implementation, the processor 3000 configured to obtain, according to the property information of the target AP, the N target Wi-Fi connection records corresponding to the target AP from the historical Wi-Fi connection data is configured to obtain a basic service set identifier (BSSID) of the target AP, and determine the N target Wi-Fi connection records from the historical Wi-Fi connection data, where each of the N target Wi-Fi connection records contains the BSSID.

In an implementation, the processor 3000 configured to obtain, according to the property information of the target AP, the N target Wi-Fi connection records corresponding to the target AP from the historical Wi-Fi connection data is configured to obtain an encryption scheme of the target AP, and determine, according to the encryption scheme of the target AP, the N target Wi-Fi connection records from the historical Wi-Fi connection data.

In an implementation, the processor 3000 configured to obtain, according to the property information of the target AP, the N target Wi-Fi connection records corresponding to the target AP from the historical Wi-Fi connection data is configured to obtain an SSID of the target AP, and determine, according to the SSID of the target AP, the N target Wi-Fi connection records from the historical Wi-Fi connection data.

In an implementation, the processor 3000 configured to connect the terminal to the target AP according to the N target Wi-Fi connection records is configured to save the N target Wi-Fi connection records to a predetermined list, and obtain, from the predetermined list, K passwords corresponding to the N target Wi-Fi connection records, and connect the terminal to the target AP according to the K passwords, where K is an integer smaller than or equal to N.

In an implementation, the processor 3000 configured to connect the terminal to the target AP according to the K passwords is configured to determine an occurrence frequency of each of the K passwords in the predetermined list to obtain K frequencies, determine a priority sequence of the K passwords according to the K frequencies, select, according to the priority sequence, a password from the K passwords, and connect the terminal to the target AP according to the password selected, an SSID and an encryption scheme of the target AP.

In an implementation, the processor 3000 configured to determine the occurrence frequency of each of the K passwords in the predetermined list is configured to determine a ratio of the number of occurrence times of each of the K passwords to N as the occurrence frequency of each of the K passwords.

In an implementation, the first password may be at least one of the following: a character string, fingerprint information, voice information, and iris information.

The implementations of the present disclosure also provide a computer storage medium. The computer readable storage medium is configured to store computer programs, where the computer programs are operable to execute some of or all operations of the method for Wi-Fi connection described in any one of method implementations of the present disclosure.

The implementations of the present disclosure also provide a computer program product. The computer program product includes a non-transitory computer-readable storage medium that stores computer programs, where the computer programs are operable with a computer to execute some of or all operations of the method for Wi-Fi connection described in any one of method implementations of the present disclosure.

Although the present disclosure has been described in conjunction with various implementations herein, however, other variations to the enclosed implementations can be understood and effected by those skilled in the art from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Those skilled in the art should understand that the implementation of the disclosure may be provided as a method, an apparatus (equipment), or a computer program product. Therefore, the present disclosure may use a form of hardware only implementations, software only implementations, or implementations with a combination of software and hardware. Moreover, the present disclosure may use a form of a computer program product that is implemented on one or more computer-usable storage media (including but not limited to a disk memory, a CD-ROM, an optical memory, and the like) that include computer-usable program codes. The computer program is stored/distributed in a proper medium and is provided as or used as a part of the hardware together with another hardware, or may also use another allocation form, such as by using the Internet or another wired or wireless telecommunications system.

The present disclosure is described in connection with flowcharts and/or block diagrams of the method, apparatus (equipment), and computer program products according to the implementations of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor, or a processor of other programmable data processing equipment to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operations are executed on the computer or the other programmable data processing device to generate processing implemented by the computer, and operations for realizing the function specified in one flow or many flows in the flowcharts and/or one block or many blocks in the block diagrams are provided by the instructions executed on the computer or the other programmable data processing device.

Although the present disclosure is described in connection with specific characteristics and the implementations, obviously, various modifications and combinations may be made to the disclosure without departing from the spirit and scope of the disclosure. Correspondingly, the specification and the drawings are only exemplary descriptions about the disclosure defined by the appended claims, and are considered to cover any and all modifications, variations, combinations or equivalents in the scope of the disclosure. Obviously, those skilled in the art may make various modifications and variations to the disclosure without departing from the spirit and scope of the disclosure. Therefore, if these modifications and variations of the disclosure belong to the scope of the claims of the disclosure and equivalent technologies thereof, the disclosure is also intended to include these modifications and variations.

What is claimed is:

1. A method for wireless fidelity (Wi-Fi) connection, comprising:
   obtaining an input password used for connecting a terminal to a target access point (AP);
   obtaining, according to property information of the target AP, N target Wi-Fi connection records corresponding to the target AP from historical Wi-Fi connection data in response to an unsuccessful verification of the input password, the historical Wi-Fi connection data containing M Wi-Fi connection records, M being a positive integer, and N being a positive integer smaller than or equal to M;
   saving the N target Wi-Fi connection records to a predetermined list;
   obtaining, from the predetermined list, K passwords corresponding to the N target Wi-Fi connection records, K being an integer less than or equal to N; and
   connecting the terminal to the target AP according to the K passwords.

2. The method of claim 1, wherein obtaining, according to the property information of the target AP, the N target Wi-Fi connection records corresponding to the target AP from the historical Wi-Fi connection data comprises:
   obtaining a service set identifier (SSID) and an encryption scheme of the target AP; and
   determining, according to the SSID and the encryption scheme of the target AP, the N target Wi-Fi connection records from the historical Wi-Fi connection data.

3. The method of claim 1, wherein obtaining, according to the property information of the target AP, the N target Wi-Fi connection records corresponding to the target AP from the historical Wi-Fi connection data comprises:
   obtaining a basic service set identifier (BSSID) of the target AP; and
   determining the N target Wi-Fi connection records from the historical Wi-Fi connection data, each of the N target Wi-Fi connection records containing the BSSID.

4. The method of claim 1, wherein obtaining, according to the property information of the target AP, the N target Wi-Fi connection records corresponding to the target AP from the historical Wi-Fi connection data comprises:
   obtaining an encryption scheme of the target AP; and
   determining, according to the encryption scheme of the target AP, the N target Wi-Fi connection records from the historical Wi-Fi connection data.

5. The method of claim 1, wherein obtaining, according to the property information of the target AP, the N target Wi-Fi connection records corresponding to the target AP from the historical Wi-Fi connection data comprises:
   obtaining an SSID of the target AP; and
   determining, according to the SSID of the target AP, the N target Wi-Fi connection records from the historical Wi-Fi connection data.

6. The method of claim 1, wherein connecting the terminal to the target AP according to the K passwords comprises:
   determining an occurrence frequency of each of the K passwords in the predetermined list to obtain K frequencies;
   determining a priority sequence of the K passwords according to the K frequencies;
   selecting, according to the priority sequence, a password from the K passwords; and
   connecting the terminal to the target AP according to the password selected, an SSID and an encryption scheme of the target AP.

7. The method of claim 6, further comprising:
   determining a ratio of the number of occurrence times of each of the K passwords in the predetermined list to N as the occurrence frequency of each of the K passwords in the predetermined list.

8. The method of claim 1, wherein the input password comprises at least one of: a character string, fingerprint information, voice information, and iris information.

9. A terminal comprising:
   at least one processor; and
   a computer readable memory, coupled to the at least one processor and storing at least one computer executable instruction therein, which when executed by the at least one processor, causes the at least one processor to carry out actions, comprising:
      obtaining an input password used for connecting the terminal to a target access point (AP);
      obtaining, according to property information of the target AP, N target Wi-Fi connection records corresponding to the target AP from historical Wi-Fi connection data in response to an unsuccessful verification of the input password, the historical Wi-Fi connection data containing M Wi-Fi connection records, M being a positive integer, and N being a positive integer smaller than or equal to M;
      saving the N target Wi-Fi connection records to a predetermined list;
      obtaining, from the predetermined list, K passwords corresponding to the N target Wi-Fi connection records, K being an integer less than or equal to N; and
      connecting the terminal to the target AP according to the K passwords.

10. The terminal of claim 9, wherein the at least one processor carrying out the action of obtaining, according to the property information of the target AP, the N target Wi-Fi connection records corresponding to the target AP from the historical Wi-Fi connection data is caused to carry out actions, comprising:
   obtaining a service set identifier (SSID) and an encryption scheme of the target AP; and
   determining, according to the SSID and the encryption scheme of the target AP, the N target Wi-Fi connection records from the historical Wi-Fi connection data.

11. The terminal of claim 9, wherein the at least one processor carrying out the action of obtaining, according to the property information of the target AP, the N target Wi-Fi connection records corresponding to the target AP from the historical Wi-Fi connection data is caused to carry out actions, comprising:
   obtaining a basic service set identifier (BSSID) of the target AP; and
   determining the N target Wi-Fi connection records from the historical Wi-Fi connection data, each of the N target Wi-Fi connection records containing the BSSID.

12. The terminal of claim 9, wherein the at least one processor carrying out the action of obtaining, according to the property information of the target AP, the N target Wi-Fi connection records corresponding to the target AP from the historical Wi-Fi connection data is caused to carry out actions, comprising:

obtaining an encryption scheme of the target AP; and determining, according to the encryption scheme of the target AP, the N target Wi-Fi connection records from the historical Wi-Fi connection data.

13. The terminal of claim 9, wherein the at least one processor carrying out the action of obtaining, according to the property information of the target AP, the N target Wi-Fi connection records corresponding to the target AP from the historical Wi-Fi connection data is caused to carry out actions, comprising:

obtaining an SSID of the target AP; and determining, according to the SSID of the target AP, the N target Wi-Fi connection records from the historical Wi-Fi connection data.

14. The terminal of claim 9, wherein the at least one processor carrying out the action of connecting the terminal to the target AP according to the K passwords is caused to carry out actions, comprising:

determining an occurrence frequency of each of the K passwords in the predetermined list to obtain K frequencies;

determining a priority sequence of the K passwords according to the K frequencies;

selecting, according to the priority sequence, a password from the K passwords; and connecting the terminal to the target AP according to the password selected, an SSID and an encryption scheme of the target AP.

15. The terminal of claim 14, wherein the at least one computer executable instruction further causes the at least one processor to carry out actions, comprising:

determining a ratio of the number of occurrence times of each of the K passwords in the predetermined list to N as the occurrence frequency of each of the K passwords in the predetermined list.

16. The terminal of claim 9, wherein the input password comprises at least one of: a character string, fingerprint information, voice information, and iris information.

17. A terminal comprising:

at least one processor; and a computer readable memory, coupled to the at least one processor and storing at least one computer executable instruction therein, which when executed by the at least one processor, causes the at least one processor to carry out actions, comprising:

determining, in response to an unsuccessful connection to an AP according to an input password, plurality of passwords from historical Wi-Fi connection data pre-stored in the terminal, wherein each of the plurality of passwords was previously used for connecting the terminal to the AP; and connecting the terminal to the AP according to the plurality of passwords.

18. The terminal of claim 17, wherein the at least one password is embodied as a plurality passwords; and the at least one processor carrying out the action of connecting the terminal to the AP according to the at least one password is caused to carry out actions, comprising:

determining a priority sequence of the plurality of passwords; and selecting the plurality of passwords sequentially according to the priority sequence to connect the terminal to the AP.

* * * * *